Feb. 13, 1968     K. R. JOHNSON     3,368,673
CONDITION DETECTING AND SORTING MEANS
Filed Feb. 17, 1966     4 Sheets-Sheet 1

INVENTOR
Kenneth R. Johnson
by Wolfe, Hubbard, Voit & Osann
ATTORNEY

Feb. 13, 1968     K. R. JOHNSON     3,368,673
CONDITION DETECTING AND SORTING MEANS
Filed Feb. 17, 1966     4 Sheets-Sheet 2
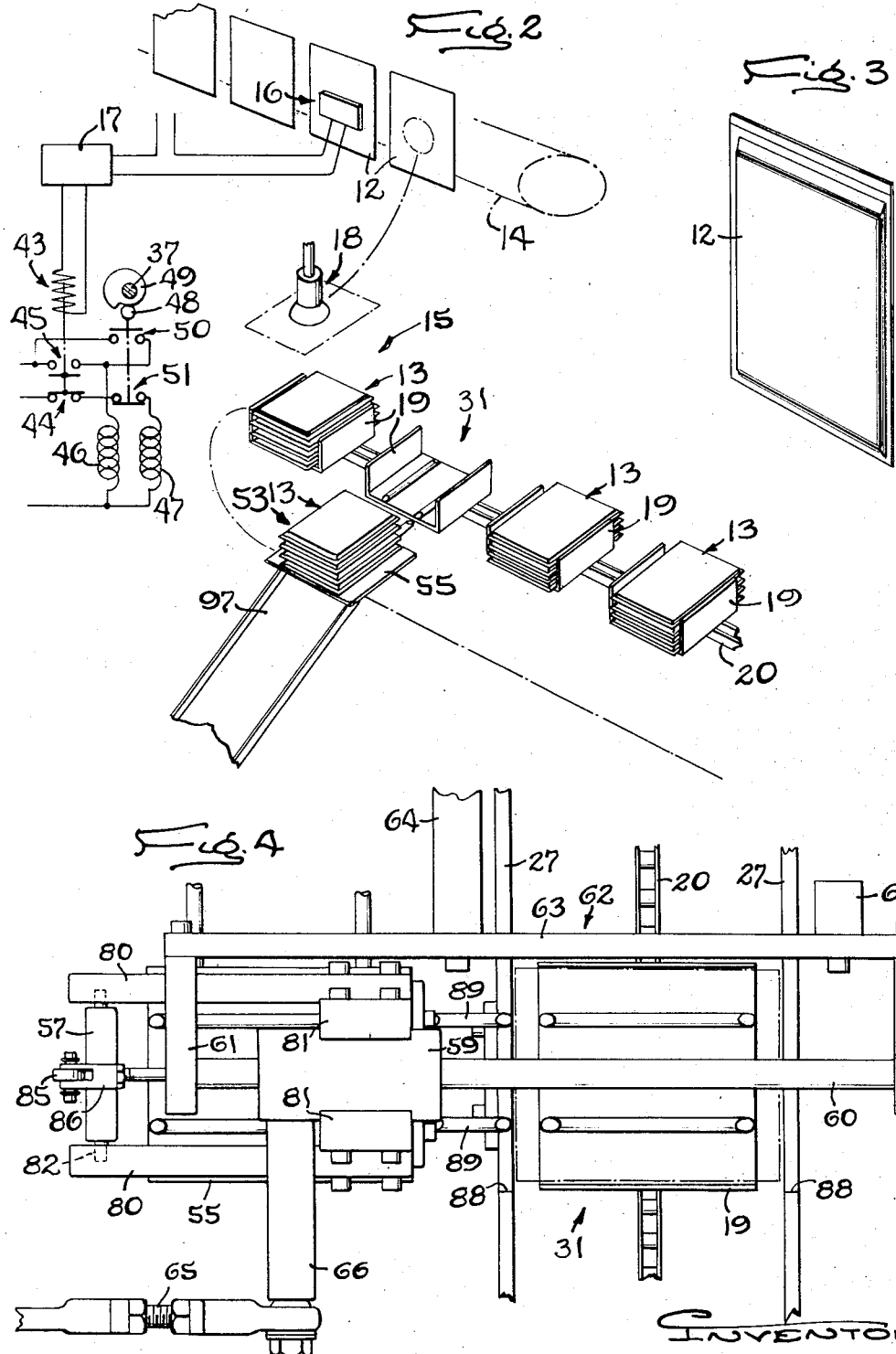

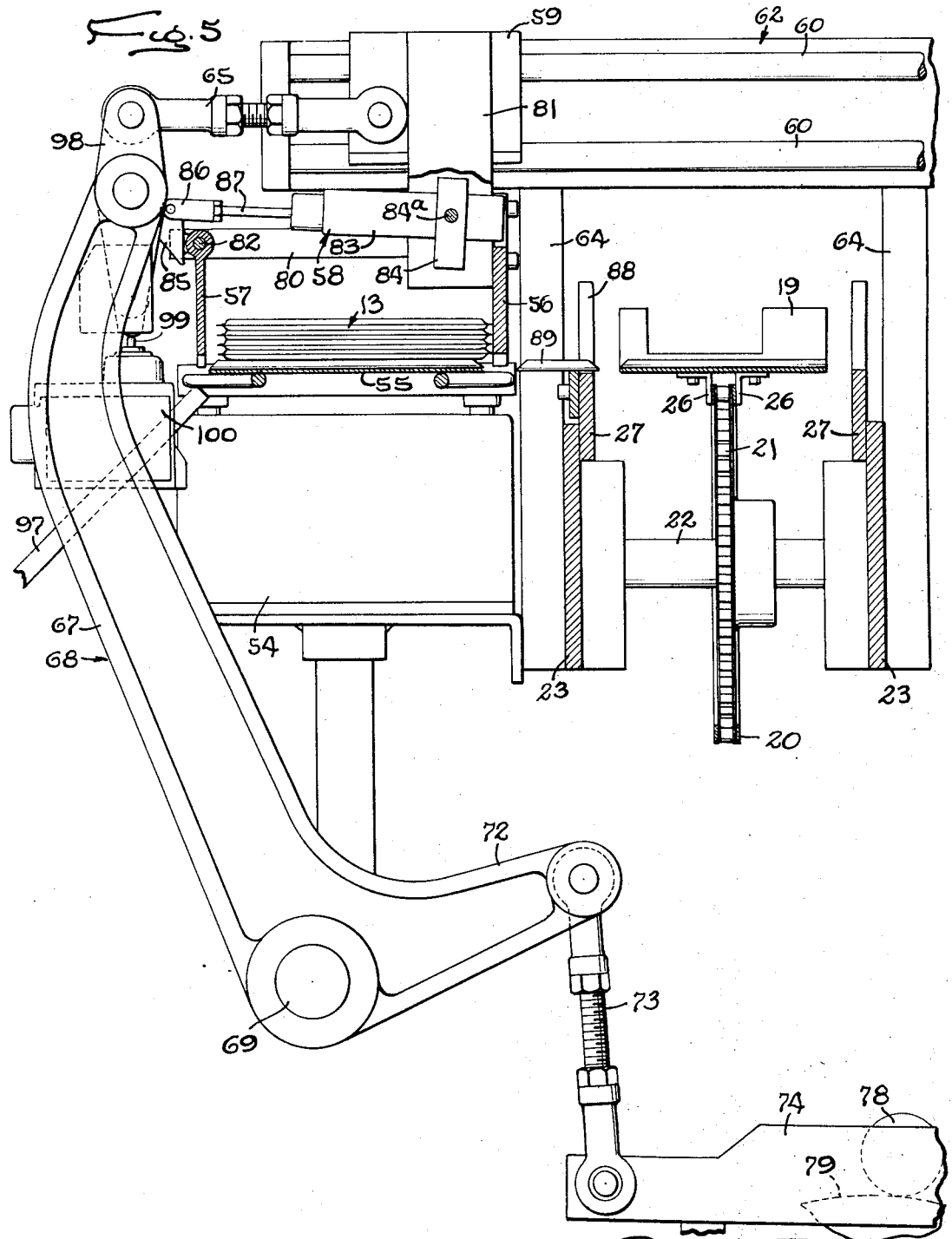

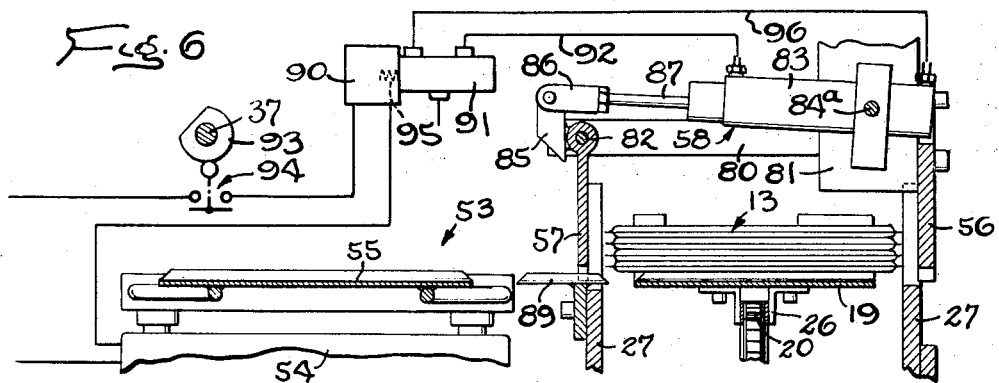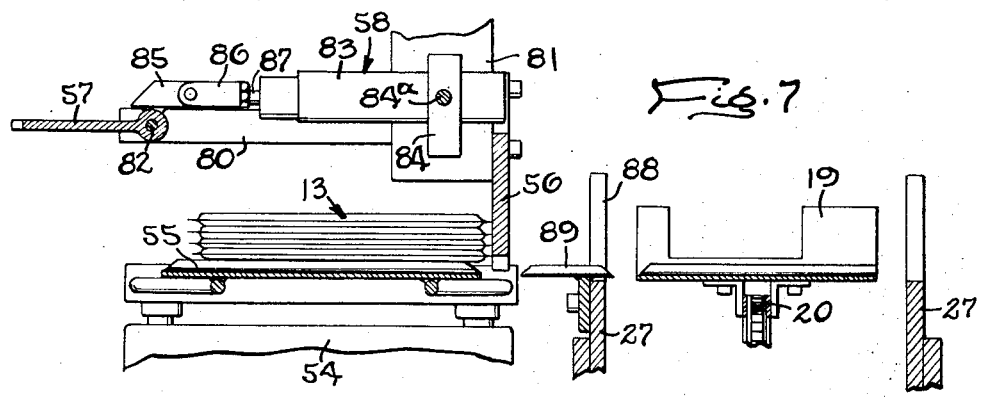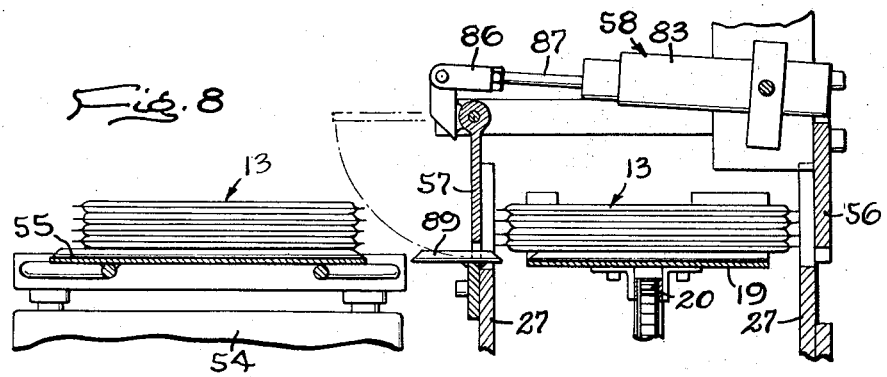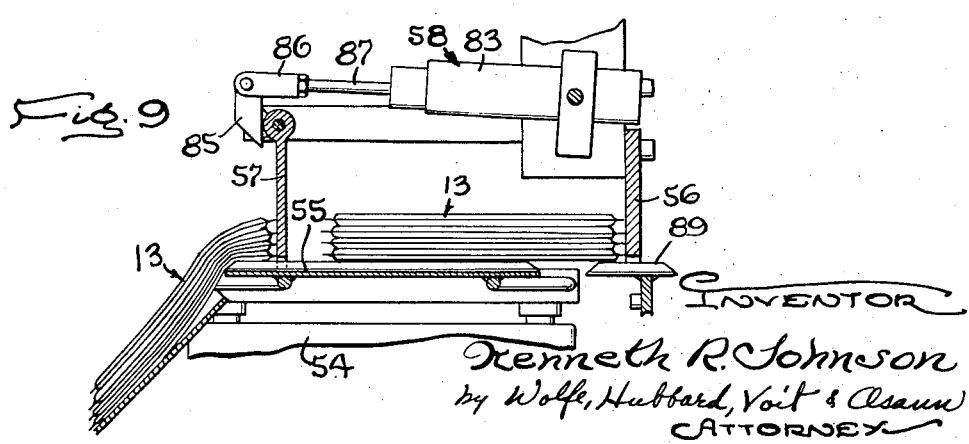

United States Patent Office 3,368,673
Patented Feb. 13, 1968

3,368,673
CONDITION DETECTING AND SORTING
MEANS
Kenneth R. Johnson, Rockford, Ill., assignor to Bartelt
Engineering Company, Inc., Rockford, Ill., a corporation of Delaware
Filed Feb. 17, 1966, Ser. No. 528,117
9 Claims. (Cl. 209—73)

The invention relates to a machine for detecting the presence of irregular conditions in a series of articles and for separating from the series those articles not conforming with predetermined standards. More particularly, the invention has reference to a packaging machine in which the articles are filled packages advanced by a carrier to a transfer station and thereafter delivered to a detecting station wherein a check weigher produces a signal if the weight of the packages is not within an acceptable range and initiates action for classification of the packages according to their acceptability.

The general object of the invention is to provide in a machine of the above character a new and improved transfer mechanism for delivering the articles from the carrier to the detecting station and for returning only articles of acceptable standards back to the carrier for conveyance to a further operation or to a terminal station.

A related object is to provide a transfer mechanism which responds to the signal produced by the check weigher to return packages of correct weight to the carrier while leaving those of improper weight in the detecting station.

A more detailed object is to provide a transfer mechanism having a pair of spaced article engaging members, one of which is normally positioned to return conforming articles from the detecting station to the carrier and is disabled to leave non-conforming articles in the detecting station for subsequent discard.

Another object is to utilize the transfer mechanism not only for shuttling conforming articles between the transfer station and the detecting station but also for discarding a non-conforming article in the detecting station as an incident to the delivery of the next article from the transfer station.

Other objects and advantages will become apparent from the following detailed description taken in connection with the accompanying drawings in which:

FIG. 2 is a schematic perspective view illustrating the pertinent steps performed by the machine.

FIG. 3 is an enlarged perspective view of a filled package adapted to be handled by the machine.

FIG. 4 is an enlarged fragmentary plan view of the machine shown in FIG. 1.

FIG. 5 is an enlarged fragmentary cross-section taken substantially along the line 5—5 of FIG. 1.

FIGS. 6 to 9 are enlarged fragmentary cross-sectional views similar to a portion of FIG. 5 and illustrating the sequence of operation of the transfer mechanism.

Figure 1:
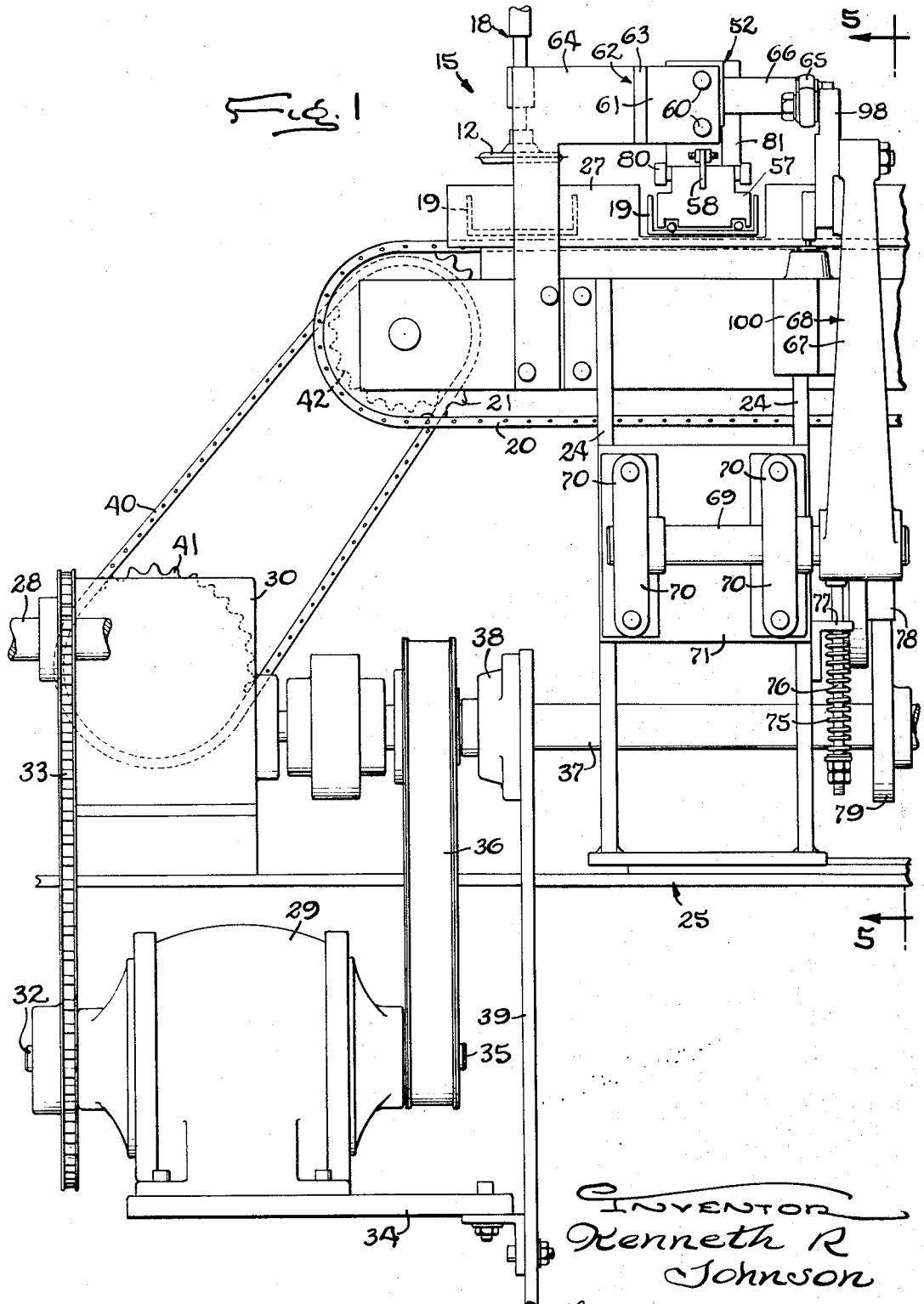
FIGURE 1 is a fragmentary side elevation of a machine embodying the novel features of the present invention.

While the invention is applicable to machines and articles of various kinds, it is shown in the drawings for purposes of illustration incorporated in a machine which packages a product in packages or pouches 12, arranges the pouches in stacks 13, herein of four pouches each, and conveys the stacks along a predetermined path for performance of subsequent operations including checking of the stacks to insure that the pouches in each stack have the proper amount of product therein. After being checked, the satisfactory stacks are carried to a terminal station (not shown) to be inserted in cartons for eventual shipment.

The pouches 12, initially formed with open upper ends, are filled and sealed by the packaging machine and are delivered edgewise therefrom by a conveyor 14 for step-by-step advancement along a horizontal path to a loading station 15 (FIG. 2). As each vertically disposed pouch approaches this station, it actuates a switch 16 thereby to register a count of one on a counter 17. A suction-operated pick-off mechanism 18 then transfers the pouch to one of a series of holders 19 on a carrier 20. The pick-off mechanism may be of the type disclosed in the Negoro patent, 2,826,881, to which reference may be had for details of construction. In this type of arrangement, the pick-off mechanism is connected to a suitable vacuum source to grip the pouch as the latter is delivered from the packaging machine and is swung in a ninety degree arc to position the pouch over the carrier 20. The pick-off then is disconnected from the vacuum source thereby dropping the pouch onto the carrier, and thereafter is swung reversely into position to receive the next pouch from the packaging machine.

As shown in FIGS. 1 and 5, the carrier 20 is an endless chain trained around a sprocket wheel 21 fast on a shaft 22 extending between and journaled on a pair of parallel horizontal rails 23 supported on posts 24 projecting upwardly from a frame 25. A second sprocket wheel and shaft assembly (not shown) supports the carrier chain near the opposite ends of the rails. The holders 19 are in the form of upwardly opening U-shaped buckets spaced along the chain and secured thereto by brackets 26 (FIG. 5). The pouches 12 are prevented from sliding out of the open sides of the buckets by retaining plates 27 extending along opposite sides of the upper run of the chain and welded to the frame rails 23 closely adjacent the buckets.

The power shaft 28 (see FIG. 1) of the packaging machine acts through a clutch-brake unit 29 and a Geneva mechanism 30 to advance the buckets 19 intermittently from the loading station 15 to a transfer station 31 (FIG. 2) spaced along the path of the carrier chain 20 from the loading station. Herein, the power shaft 28 is rotated continuously and is coupled to the input shaft 32 of the unit 29 by a drive chain 33 trained around sprocket wheels on the two shafts. The clutch-brake unit is positioned on a platform 34 disposed alongside the frame 25 and includes an output shaft 35 connected by an endless belt 36 to a cycle shaft 37 journaled in a bearing 38 rigid with an arm 39 upstanding from the platform. The cycle shaft, in turn, leads to and drives the Geneva mechanism which is mounted on the frame. To complete the drive train, a chain 40 extends around the driven sprocket wheel 41 of the Geneva mechanism and also around a sprocket wheel 42 fast on the shaft 22 mounting the carrier chain 20.

When the counter 17 has registered four times, indicating that four pouches 12 have been arranged in a stack 13 in a bucket 19 located in the loading station 15, a relay 43 (shown schematically in FIG. 2) is energized to open switch contacts 44 and simultaneously close switch contacts 45. Closure of these contacts energizes an electromagnetic clutch 46 within the clutch-brake unit 29 to couple the rotating input shaft 32 of the unit with the output shaft 35, and at the same time, an electromagnetic brake 47 associated with the output shaft is released thereby permitting rotation of the output shaft which then rotates the cycle shaft 37. After the cycle shaft has begun to rotate, the counter is reset, making contacts 44 and breaking contacts 45. The clutch and brake circuits are held in the energized and de-energized conditions respectively, by a switch operator 48 which is engaged by a cam 49 (FIG. 2) on the cycle shaft. During the initial rotation of the cycle shaft, the cam actuates the operator 48 to close contacts 50 and open contacts 51 so that the clutch remains engaged and the brake remains released independently of the relay 43.

As mentioned above, the cycle shaft 37 drives the Geneva mechanism 30 which may be similar to the one disclosed in the aforementioned Negoro patent. With this mechanism, the driven sprocket wheel 41 alternately rotates to advance the carrier 20 one step and then dwells for a predetermined period during each revolution of the cycle shaft. Thus, a bucket, after being loaded with a stack of pouches 12, is advanced to the transfer station 31 as the cycle shaft starts through one revolution and then dwells at the transfer station as the cycle shaft continues through the one revolution.

During the dwell period, the stack of pouches is delivered by a transfer mechanism 52 from the bucket 19 to a detecting or weighing station 53 where a detecting device, shown as a check weigher 54 having a scale platform 55 level with the bottom of the bucket, produces signals if the weight of the product in the pouches is either above or below an acceptable range. A check weigher suitable for the purpose of this invention is sold by Hi-Speed Check Weigher Co., Inc., Ithaca, N.Y., as Model No. WC–2. After the stack is classified according to its acceptability, the cycle shaft 37 completes the one revolution and the cam 49 actuates the switch operator 48 thereby opening contacts 50 and closing contacts 51. The clutch 46 thus is released and the brake 47 is applied so that the cycle shaft stops until another stack of packages has been placed in a bucket 19 in the loading station 15.

The present invention contemplates a new and improved transfer mechanism 52 which shuttles the pouches 12 back and forth between the carrier 20 and the detecting station 53, responds to the signals of the check weigher 54 to leave pouches of incorrect weight in the detecting station, and automatically disposes of these pouches as an incident to the delivery of a new stack of pouches from the carrier to the detecting station. To these ends, the transfer mechanism or shuttle 52 shifts back and forth across the carrier and includes a first member 56 for engaging and pushing each stack from the carrier bucket 19 onto the scale platform 55, and a second member 57 normally positioned to move the stack back to the bucket but selectively movable into a reject position to pass by a stack of incorrect weight and leave the latter on the platform. An actuator 58 responds to the signals from the check weigher to move the second member to the reject position before the non-conforming stack has been moved back to the bucket dwelling in the transfer station. Accordingly, each stack is transferred by the shuttle 52 to the weigher 54 but only satisfactory stacks are returned to the carrier. When the shuttle transfers the stack from the next succeeding bucket to the scale platform 55, the second member 57 is positioned to push the unsatisfactory stack off the side of the platform opposite the carrier.

In this instance, the shuttle 52 is carried by a car 59 in the form of a slide block guided on parallel horizontal guide rods 60 for back and forth sliding movement in a path transverse to the path of the carrier chain 20. As shown in FIGS. 1, 4 and 5, the guide rods extend transversely of the carrier above the transfer station 31 and are supported at opposite ends by the two end plates 61 of a generally U-shaped frame 62, the end plates being disposed on opposite sides of the carrier and connected by a cross piece 63. The frame 62 is mounted above the carrier by L-shaped brackets 64 (see FIG. 1) upstanding from the rails 23.

In order to shift the shuttle 52 back and forth across the carrier 20 as the latter dwells with a bucket 19 positioned at the transfer station 31, the slide 59 is moved along the rods 60 by the cycle shaft 37. For this purpose, a link 65 (FIG. 5) is pivotally connected at one end to an arm 66 projecting forwardly from the slide and at the other end to the upper end of an upright leg 67 of a bell crank 68. The latter is fulcrumed on a shaft 69 (FIGS. 1 and 5) journaled on the posts 24 in bearings 70 to turn about an axis paralleling the path of the pouches 12, the bearings 70 being bolted to a plate 71 mounted between the posts. The other leg 72 of the bell crank extends rearwardly toward the cycle shaft and is pivotally connected by a link 73 to the free end of a lever 74 overlying the cycle shaft. The rear end of the lever is pivotally mounted by a fixed pin (not shown) located beyond the cycle shaft and the forward end is urged downwardly by a coiled compression spring 75 (FIG. 1) surrounding a rod 76 pivotally connected to the crank and slidably received in a bracket 77 on the post 24. Journaled on the lever between the ends of the latter is a roller follower 78 which rides on an eccentric cam 79 fast on the cycle shaft. The cam and the spring cooperate to raise and lower the follower to rock the lever and, through the bell crank and the links 65 and 73, to move the slide 59 and the shuttle 52 back and forth.

As shown in FIGS. 4 and 5, the shuttle 52 includes a pair of spaced frame members 80 extending transversely of the carrier 20 and suspended cantilever fashion beneath the slide 59 by hangers 81 depending from opposite sides of the slide and secured to the rear ends of the frame members. The first member 56 for engaging the stacks of pouches is an upright plate rigid with and depending from the rear ends of the frame members. The second pouch engaging member 57 also is a plate which is spaced forwardly from the plate 56 a distance greater than the transverse dimension of the pouches and which preferably is pivoted at the free ends of the frame members for swinging about a horizontal pin 82 bridging the frame members. Herein, the actuator 58 for positioning the second plate 57 comprises a double-acting fluid cylinder 83 (FIGS. 4–8) centered between the hangers 81 and clamped in a collar 84, the collar having oppositely extending trunnions 84a journaled in the hangers on opposite sides of the cylinder. Welded to the upper portion of the forward plate 57 is a lever 85 pinned at its upper end to a yoke 86 on the free end of a piston rod 87 extending forwardly from the cylinder.

Initially, the shuttle 52 is disposed in the retracted position shown in FIG. 6 with the plates 56 and 57 straddling the carrier, the plate 56 being disposed on the opposite side of the carrier 20 from the detecting station. As the cycle shaft 37 begins its revolution, the follower 78 rides on a dwell surface formed on the cam 79 and the shuttle remains stationary until the cycle shaft and the Geneva mechanism 30 have advanced a loaded bucket 19 to the transfer station 31. Thereafter, the follower meets a rise on the cam thereby to shift the shuttle to the extended position in the weighing station 53 as shown in FIGS. 5, 7 and 9. As the shuttle extends, the first pusher plate 56 engages the stack of pouches in the bucket and pushes the stack through an opening 88 cut in the outer retaining plate 27, across a stationary approach platform 89 secured to the retaining plate alongside the carrier, and onto the scale platform 55 of the check weigher 54. As the cycle shaft completes its revolution, the follower encounters a fall surface on the cam and the spring 75 acts through the crank 68 and the links 65 and 73 to return the shuttle to its retracted position overlying the carrier. When the stack of pouches is of proper weight, the second pusher or return plate 57 remains in the normal upright position during the return stroke of the shuttle and engages the stack to push the latter from the scale platform back into the dwelling bucket in the transfer station. The satisfactory stack then is forwarded to the terminal station for cartoning upon the next advance of the carrier, and another stack is stepped to the transfer station for subsequent checking.

Should the weight of the stack of pouches transferred to the scale platform 55 be either over or under a predetermined value, however, the return plate 57 is disabled in response to a signal from the check weigher and does not return the irregular stack to the carrier. For this purpose, the check weigher 54 energizes a solenoid 90 (shown schematically in FIG. 6) in a manner well known in the art when a stack of improper weight is on the platform, and the solenoid in turn actuates a conventional four-way valve 91 in a direction to admit fluid through a line 92 into the forward side of the fluid cylinder 83. Thus, the piston rod 87 retracts thereby swinging the return plate to the horizontal reject position shown in FIG. 7. Accordingly, the return plate passes by the irregular stack on the return stroke of the shuttle 52 and leaves the stack resting on the scale platform (FIG. 8).

Upon return of the shuttle 52 to the retracted position over the carrier 20, a cam 93 (FIG. 6) on the cycle shaft 37 opens contacts 94 to de-energize the solenoid 90. A spring 95 then shifts the valve 91 to introduce fluid through a line 96 into the rear side of the cylinder thereby extending the rod 87 to return the plate 57 to its normal position. Accordingly, on the next forward stroke of the shuttle, the forward face of the plate 57 shoves the irregular stack off the outer side of the scale platform 55 and down an inclined chute 97 disposed alongside the check weigher 54. When the shuttle reaches the extended position, the cam 93 permits contacts 94 to close in order that the solenoid again may be responsive to any signal produced by the check weigher 54.

As a safety measure for preventing damage to the machine if the pouches 12 become jammed at the transfer station 31, a lever 98 is pivoted at its upper end to the link 65 and is coupled to the upper leg 67 of the bell crank 68 by a releasable detent (not shown). The lower end of the lever normally engages a switch operator 99 projecting upwardly from a switch housing 100 welded to the crank leg. If abnormal resistance is encountered by the shuttle 52, the detent yields and the lever pivots relative to the crank so that the lower end of the lever moves away from the switch operator. Accordingly, the switch is opened thus de-activating the power shaft 28 and shutting down the machine.

I claim as my invention:

1. In a machine for detecting irregular conditions in a series of articles movable along a predetermined path, the combination of, a carrier for supporting and advancing the articles step-by-step along said path through a transfer station, a frame, means operable in timed relation to movement of said carrier along said path for shifting said frame back and forth across the path between a retracted position in said transfer station and an extended position in a detecting station on one side of the path, first and second plates on said frame and disposed on opposite sides of said path when the frame is in said retracted position, said first plate engaging an article dwelling in said transfer station as said frame shifts from said retracted position to said extended position thereby to push the article along a second path into said detecting station, a detecting device positioned in said detecting station and operable to produce signals in response to the presence of irregular articles in the detecting station, means mounting said second plate for movement between a normal position disposed in said second path and a reject position spaced from said second path, said second plate engaging the article and returning the latter to said carrier when the second plate is in said normal position and as said frame shifts from said extended position to said retracted position, an operator connected to said second plate, actuating means for shifting said operator in one direction in response to said signals to move said second plate to said reject position whereby the second plate passes by an irregular article in said detecting station as said frame shifts from said extended position to said retracted position, and said actuating means shifting said operator in the opposite direction after said second plate passes by the irregular article thereby to return the second plate to said normal position.

2. In a machine for detecting irregular conditions in a series of articles movable along a predetermined path, the combination of, a carrier for supporting and advancing the articles step-by-step along said path through a transfer station, a shuttle shiftable back and forth across said path between a retracted position in said transfer station and an extended position in a detecting station on one side of said path, said shuttle having a first article engaging member disposed on the other side of said path for engaging an article dwelling in said transfer station as the shuttle shifts from said retracted position toward said extended position thereby to push the article along a second path transverse to said predetermined path and into said detecting station, a second article engaging member mounted on said shuttle for movement between a normal position disposed in said second path and a reject position spaced from said second path, said second member engaging the article when the second member is in said normal position and as said shuttle shifts from said extended position toward said retracted position thereby to return the article to said transfer station and said carrier, a detecting device positioned in said detecting station and operable to produce signals in response to the presence of irregular articles in the detecting station, and means responsive to said signals to move said second member to said reject position thereby to leave an irregular article in said detecting station when said shuttle returns to said transfer station.

3. A machine as defined in claim 2 in which said shuttle includes a frame and in which said second article engaging member is pivotally mounted on said frame for movement between said normal and reject positions.

4. A machine as defined in claim 2 in which said means comprise a fluid actuator connected to said second article engaging member for moving the latter between said normal and reject positions.

5. A machine as defined in claim 2 in which said article engaging members are upright plates disposed on opposite sides of said predetermined path when said shuttle is in said retracted position.

6. A machine as defined in claim 2 further including means operable in timed relation to the movement of said carrier along said predetermined path for shifting said shuttle between said extended and retracted positions.

7. In a machine for classifying packages according to weight, the combination of, a carrier for supporting and advancing packages step-by-step along a predetermined path through spaced transfer and terminal stations, a weighing device having a platform located in a weighing station on one side of said path and operable to produce signals in response to the presence of packages of irregular weight on the platform, transfer mechanism for removing a package from said carrier at said transfer station and delivering the package along a second path to said platform, said transfer mechanism being operable to return a package of correct weight from said platform back to said carrier for advancement therewith to said terminal station, and means responsive to the signal of said weighing device for rendering said transfer mechanism inoperable to return a package of irregular weight when the latter is delivered to said platform whereby the irregular package remains on the platform as said carrier advances toward said terminal station.

8. A machine as defined in claim 7 in which said transfer mechanism has first and second package engaging members disposed on opposite sides of said predetermined path with said second member being movable into and out of said second path, said means including an actuator for moving said second member out of said second path in response to the signal of said weighing device and for moving said second member back into said second path after the irregular package has been left on said platform, said second member being operable to eject the irregular package off the edge of said platform opposite said predetermined path as an incident to the delivery of a further package from said carrier to said platform.

9. In a packaging machine, the combination of, a carrier for supporting a series of articles and advancing the same step-by-step along a predetermined path to a transfer station, means for receiving and supporting successive articles at a second station on one side of said path and beside said transfer station, a reciprocating car movable back and forth through forward and return strokes transversely of said path between a retracted position overlying said carrier at said transfer station and an extended position overlying said supporting means at said second station, mechanism for reciprocating said car in timed relation with the advance of the articles on the carrier, first and second pushers straddling said path when car is in said retracted position, said first pusher being disposed on the side of said path opposite said second station to push successive articles along a second path to said second station as the car moves through successive forward strokes, said second pusher being mounted on said car for movement from an active position disposed in said second path ahead of the articles being pushed to said second station, to an inactive position out of said path, actuating means for moving said second pusher to said inactive position at the end of one forward stroke of said car and returning the pusher to said active position for the next forward stroke thereby to leave the one article on said supporting means and subsequently push said one article away from said carrier and off said supporting means, and means for signaling an irregular condition of articles on said supporting means, said actuating means positioning said second pusher in response to such signaling to leave irregular articles on said supporting means and to return regular articles to said carrier.

References Cited

UNITED STATES PATENTS 3,056,497   10/1962   Hallam et al. _____ 209—121

ALLEN N. KNOWLES, *Primary Examiner.*